United States Patent [19]
Herzog

[11] Patent Number: 5,150,571
[45] Date of Patent: Sep. 29, 1992

[54] DEVICE FOR EXPOSING OR SHUTTING OFF A TURBO-ENGINE ON THE INTAKE AIR SIDE OF THE ENGINE

[75] Inventor: Claus Herzog, Munich, Fed. Rep. of Germany

[73] Assignee: MTU Motoren- Und Turbinen-Union Munchen GmbH, Fed. Rep. of Germany

[21] Appl. No.: 631,886

[22] Filed: Dec. 21, 1990

[30] Foreign Application Priority Data

Dec. 21, 1989 [DE] Fed. Rep. of Germany ....... 3942323

[51] Int. Cl.⁵ .......................... F02K 1/08; F02K 1/04; F02C 7/00
[52] U.S. Cl. .................... 60/200.1; 60/224; 60/225; 60/244; 137/15.1
[58] Field of Search ................. 60/224, 225, 244, 245, 60/200.1; 137/15.1, 15.2

[56] References Cited

U.S. PATENT DOCUMENTS

| | | | |
|---|---|---|---|
| 3,242,671 | 3/1966 | Moorehead | 137/15.1 |
| 3,495,605 | 2/1970 | Gunnarson et al. | 137/15.2 |
| 3,659,422 | 5/1972 | Hope | 60/224 |
| 3,841,091 | 10/1974 | Sargisson et al. | 60/224 |

Primary Examiner—Richard A. Bertsch
Assistant Examiner—Howard R. Richman
Attorney, Agent, or Firm—Evenson, Wands, Edwards, Lenahan & McKeown

[57] ABSTRACT

A stationary centerbody includes vaulted areas displaced substantially by 180° axially as well as along the circumference with respect to one another on its largest relative diameter. The vaulted areas, while enclosing a shut-off surface which is diagonal on the circumference side with respect to the end of an engine shroud forming a casing lip, encloses an axially spaced circumferential surface which is shut off in the manner of an annular slide valve from the end of the shroud.

20 Claims, 5 Drawing Sheets

DEVICE FOR EXPOSING OR SHUTTING OFF A TURBO-ENGINE ON THE INTAKE AIR SIDE OF THE ENGINE

BACKGROUND AND SUMMARY OF THE INVENTION

This invention relates to a device for exposing or shutting off a turbo jet engine and, more particularly, to a device for exposing or shutting off a turbo jet engine on the intake air or exhaust gas side of the engine.

It is generally known for gas turbine engines and gas turbine jet engines to provide stationary centerbodies arranged coaxially with respect to the engine axis. For example, these centerbodies may be arranged on the air approach or intake side. These centerbodies have a general "drop-type" shape which is divergent/convergent in the direction of the flow, their largest diameter being developed in a plane extending perpendicularly with respect to the longitudinal axis or engine axis. In this case, at the point of the largest diameter of the centerbody with respect to a shroud coaxial to the engine, a ring-shaped overall flow cross-section is constructed in the engine. This ring-shaped flow cross section, in turn, necessitates a comparatively large outer diameter of the engine.

It has been suggested to combine centerbodies of this type with adjustable shut-off devices. This results in comparatively large diameters for the centerbody, which diameters have no reasonable relationship to already achievable engine or engine component diameters, i.e., the latter relates to engines which, despite a high power and usage spectrum, can have the effect of achieving comparatively low aerodynamic face resistances. Thus, for example, a centerbody of the indicated type that is to be ed on the air inlet side, with a view to achievable power and thrust standards, requires a relatively large overall diameter. This overall diameter virtually cannot be any smaller in order to ensure a relatively large mass flow in an engine compressor within the scope of the required flow Mach numbers, in a release position of respective shut-off devices on the air approach flow side of the engine.

Although the above-mentioned centerbodies have the advantage of a comparatively high component stability, when used in conjunction with multiple-flap concepts constructed in the manner of propelling nozzles or the like as shut-off devices, the danger of ingesting fragments or damaging the engine from the fragment ingestion exists. This is true even though the centerbodies have no great variety of parts or susceptibility to disturbances.

There is therefore needed centerbodies of this type which may be used, for example, in conjunction with the mentioned shutoff devices in order to:

(1) shut off or expose a "normal" gas turbine jet engine, such as a single-circuit engine, on the air inlet and/or gas outlet side, with respect to the environment, in an aerodynamically favorable manner. For this purpose, a flight apparatus concept is conceivable having separately arranged ramjet and turbo-engines. In this case, the turbo engines would have to shut off and stop during exclusive ramjet operation;

(2) In the case of a gas turbine jet engine in a multi-circuit or multiple-flow construction having variable power distribution, i.e. a "compound engine", the centerbodies may be used to permit the selective distribution, for example, of a mass air flow to an inner and/or an outer engine circuit; and (3) In the case of a compound gas-turbine ramjet engine, the centerbodies may be used to shut off the basic turbo-engine during an exclusive ramjet operation with respect to a ram pressure air flow on the air inlet side or on the exhaust gas outlet side. The basis in this case would be, for example, a ram pressure air duct having a ring construction shrouding the basic turbo-engine and which, on the front side, has a common variable air inlet (ground take-off to operation during hypersonic flight) for the base engine and the ramjet engine part. Downstream of the hot-gas outlet (nozzle) of the basic engine, the ram pressure air duct may, in this case, transform into a part comprising an afterburning and booster burning device (ramjet propulsion) in addition to a variable propelling nozzle connected to it. Within the scope of the last-mentioned compound engine concept, a variant would be conceivable with a front fan which is shut down during the ramjet operation and which, in the subsonic flight operation, delivers into the ram pressure air duct which, in this case, functions as a bypass flow duct for the secondary circuit.

The present invention provides an engine shut-off device which is suitable within the scope of the above-mentioned applications and which, in view of the construction and assignment to the jet engine or basic turbo-engine, permits an overall aerodynamically favorable slender engine while allowing an aerodynamically optimal shutting-off or exposing on the air inlet side and/or the hot-gas side of the engine.

The present invention meets these needs by providing an engine shroud having a face end forming a casing lip; a stationary centerbody arranged in front of the engine having a largest relative direction and at least two vaulted areas axially and circumferentially displaced approximately 180° with respect to one another along said largest relative diameter. The stationary centerbody encloses an axially spaced circumferential surface between the at least two vaulted areas and the casing lip. An annular slide valve selectively extends from the engine shroud to expose or shut off the axially spaced circumferential surface.

A spatially offset drop-type or mushroom-shaped design of the centerbody makes it possible to construct, for example, a single-circuit gas turbine jet engine which is comparatively slender or has a small diameter. In the release position of the annular-slide-valve-type shut-off devices, in view of a comparatively large mass flow through the engine (comparably high thrust requirement), the centerbody makes available a correspondingly adapted large air inflow cross-section into the compressor within the scope of the required flow criteria, i.e. Mach numbers, etc. Correspondingly, this also applies to a compound gas turbine ramjet engine in which the basic turbo-engine (interior engine) in the subsonic flight operation can, for example, be supplied with the required amount of intake air by way of an exterior annular ram pressure air duct located on the inlet side. In this case, the basic engine which can be designed to be comparatively slender or have a small engine diameter, again allows an overall engine which can be designed with a relatively low face resistance. Particularly for the compound gas turbine ramjet engine, the relative enlargement of the length of the centerbody resulting from the invention plays no significant role because of the comparatively large installation length which is available for the variable air inlet of the overall engine by way of the duct wing connected in front of it on the front side.

The centerbody, according to the present invention, has surface contractions which are locally offset along the overall circumference, have different sizes and which, on the whole, without any difficulties ensure a required relatively high air or gas mass flow while the engine shroud spacing and thus the engine diameter is significantly reduced in comparison to known constructions.

In accordance with a diagonal cylinder cut of the circular cylindrical shut-off devices such as annular slide valves, rings, or hood-type bodies, a slight uniformly elliptical contoured end section is obtained. The contoured end section can be moved against the centerbody, or against a correspondingly adapted contoured elliptic as well as diagonal circumferential shut-off surface of the centerbody, for example, for the shutting-off of the engine on the intake air side. However, it is possible to construct the shut-off device, at least at the end on the shut-off side, with a slightly elliptic cross-section in such a manner that, in accordance with a diagonal cut of the locally elliptic end, a circular end of the shut-off device is formed. The diagonal circumferential shut-off surface of the centerbody would have to be adapted cylindrically to the circular end.

For example, with respect to the air intake side of the engine, a downstream located section of the centerbody beginning at a wall geometry, i.e. The convergent part, extends first asymmetrically with respect to the engine axis toward the interior and may be designed to be rotationally-symmetrically diverging in the downstream direction in order to thus form a speed-increasing uniform duct contraction for the air flow in the direction of the compressor inlet. In this manner, irregularities caused in the air flow along the overall circumference can be homogenized before entering the compressor.

Other objects, advantages and novel features of the present invention will become apparent form the following detailed description of the invention when considered in conjunction with the accompanying drawings.

DETAILED DESCRIPTION OF THE DRAWINGS

Figure 1:
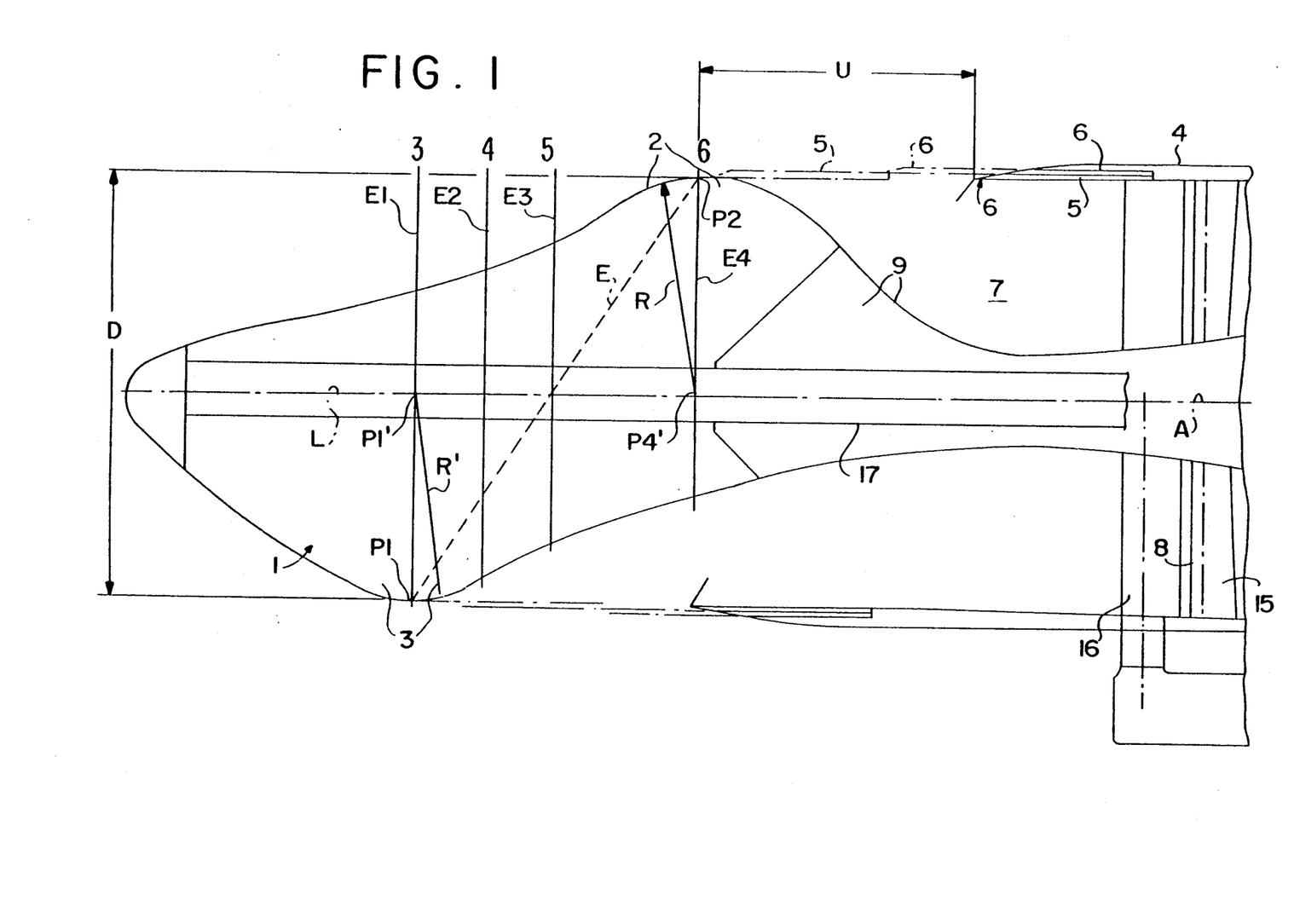
FIG. 1 is a central longitudinal sectional view of a front section of a single-circuit gas turbine jet engine according to the present invention.

FIG. 1 illustrates a front section of an engine together with a compressor inlet, a spatially offset drop-shaped centerbody 1 as well as a telescope-type annular slide valve. The slide valve is shown in two different end positions with respect to a cylindrical circumferential surface which can selectively be either exposed or shut off between a front side casing lip and a diagonal circumferential shut-off surface of the centerbody 1.

The centerbody 1 is stationarily arranged in front of the engine (not shown) around which is a local circumferential air flow. The centerbody 1 has vaulted areas 2, 3 which are spaced in the axial direction from its longitudinal axis L and are displaced with respect to one another along the circumference of the centerbody 1 by approximately 180° along the centerbody's largest relative diameter D. The largest relative diameter D is, for example, on the order of 1600 mm. The outer curvatures of the vaulted areas 2, 3, viewed in an axial direction of FIG. 1, are essentially formed by radii R and R' around points P1' and P4' wherein R and R'=D/2.

According to a plane formed through the diagonal path E with respect to the engine axis A or the axis L of the centerbody 1, the centerbody forms an elliptic-shaped shut-off surface extending along its outer circumference. Between the shut-off surface of plane E and the front end of a casing lip G, a spacing or opening U is formed, which extends around the circumference of casing lip G in a cylindrical manner. This opening U is, for example, either shut off or exposed to the outside environment on the air intake side of the engine as conditions warrant. The spacing U, for example, has a length of approximately 1025 mm.

The casing lip G is a component of the corresponding local end of a shroud 4 for the jet engine (not shown). As shown in FIG. 1, the shroud end exterior having the casing lip G, in coordination with the diagonal plane of the circumference-side shut-off surface of the centerbody 1, which is shown to be elliptically-shaped in FIG. 1, is constructed to extend in a bevelled manner in the same direction as the axes A and L. The previously mentioned vaulted areas 2, 3 of the centerbody form a drop or mushroom-shaped centerbody which is axially and circumferentially displaced in space. The plane formed through diagonal E intersects the vaulted areas 2,3 at points P1, P2 which, in the longitudinal sectional view, represent the largest local centerbody diameter D. Points P1 and P2 also form local intersecting points with axially vertical intersecting planes E1 (Section A—A, FIG. 3) and E4 (Section D—D, FIG. 6). The axial distance between planes E1 and E4 being approximately equal to the surface length U. Further, a plane E3 bisects the oblique plane E between points P1 and P2.

Figure 3:
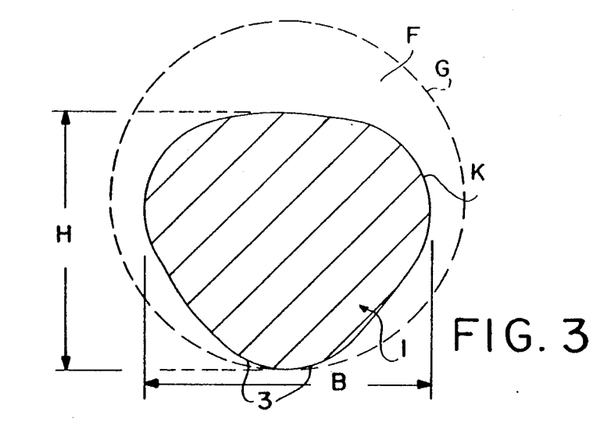
FIG. 3 is a vertical sectional view of a slide valve according to line A—A of FIG. 1 or 2.

According to Section A—A, shown in FIG. 3, a substantially triangular cross-sectional contour is obtained having a height H of approximately 1180 mm and a width B of 1300 mm. The cross section is not rotationally symmetrical and is of a polygon type. In this case, the triangular cross section is softly rounded on all sides with a maximum downward outer surface vault with respect to the circular contour of the casing lip G, when viewed from the front.

Figure 4:
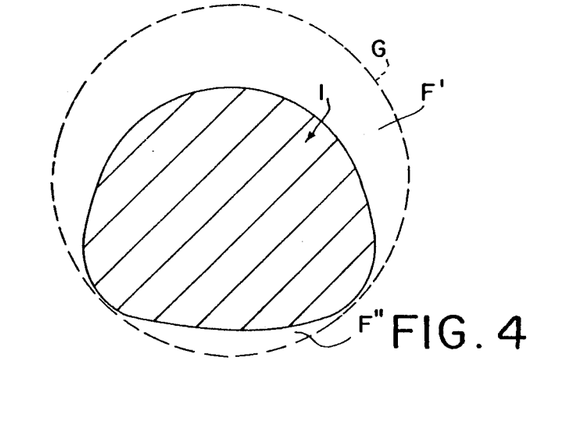
FIG. 4 is a vertical sectional view of the slide valve according to line B—B of FIGS. 1 or 2.
Figure 6:
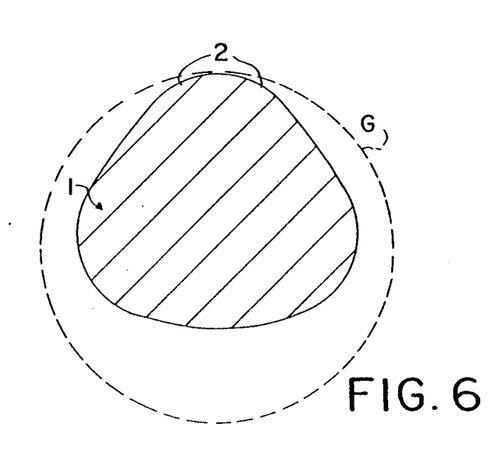
FIG. 6 is a vertical sectional view of the slide valve according to line D—D of FIGS. 1 or 2.

Correspondingly, FIG. 6 shows the cross section of the centerbody through Section D—D forming plane E4 (FIG. 1) having dimensions likewise corresponding with FIG. 3. In this case, the cross-sectional profile of the centerbody 1 having the vaulted area 2 is maximally rounded in the outer upward direction. FIG. 4 shows a cross section according to Section B—B, i.e. plane E2 of FIG. 1. This cross section profiles the transition of the centerbody 1. The centerbody is not rotationally symmetrical and is of a polygon type. In this case, the cross section of the centerbody is laterally rounded out in an area radially toward the outside of the centerbody in the downward direction. The downward area is rounded out in a more defined manner than the remaining elliptically-shaped partial cross-section located radially inward from the lip G. The remaining elliptically-shaped cross section forms a crescent-shaped residual space with respect to the lip contour G. When viewed from the approach flow side in front, the intake air surface (F of FIG. 3) available between the outer contour K and the casing lip G may, for example, be divided into two crescent shaped partial surfaces F' and F" as shown in FIG. 4.

Figure 5:
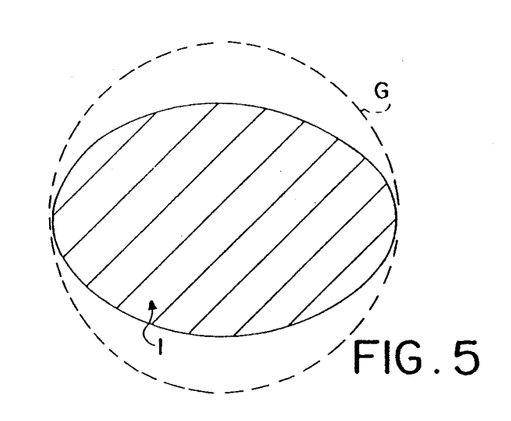
FIG. 5 is a vertical sectional view of the slide valve according to line C—C of FIGS. 1 or 2.

According to Section C—C shown in FIG. 5, a symmetrically elliptic vaulted cross-sectional profile of the centerbody 1 is obtained along the vertical plane E3 (FIG. 1). The elliptical cross section has its largest axis in the transverse direction.

Figure 2:
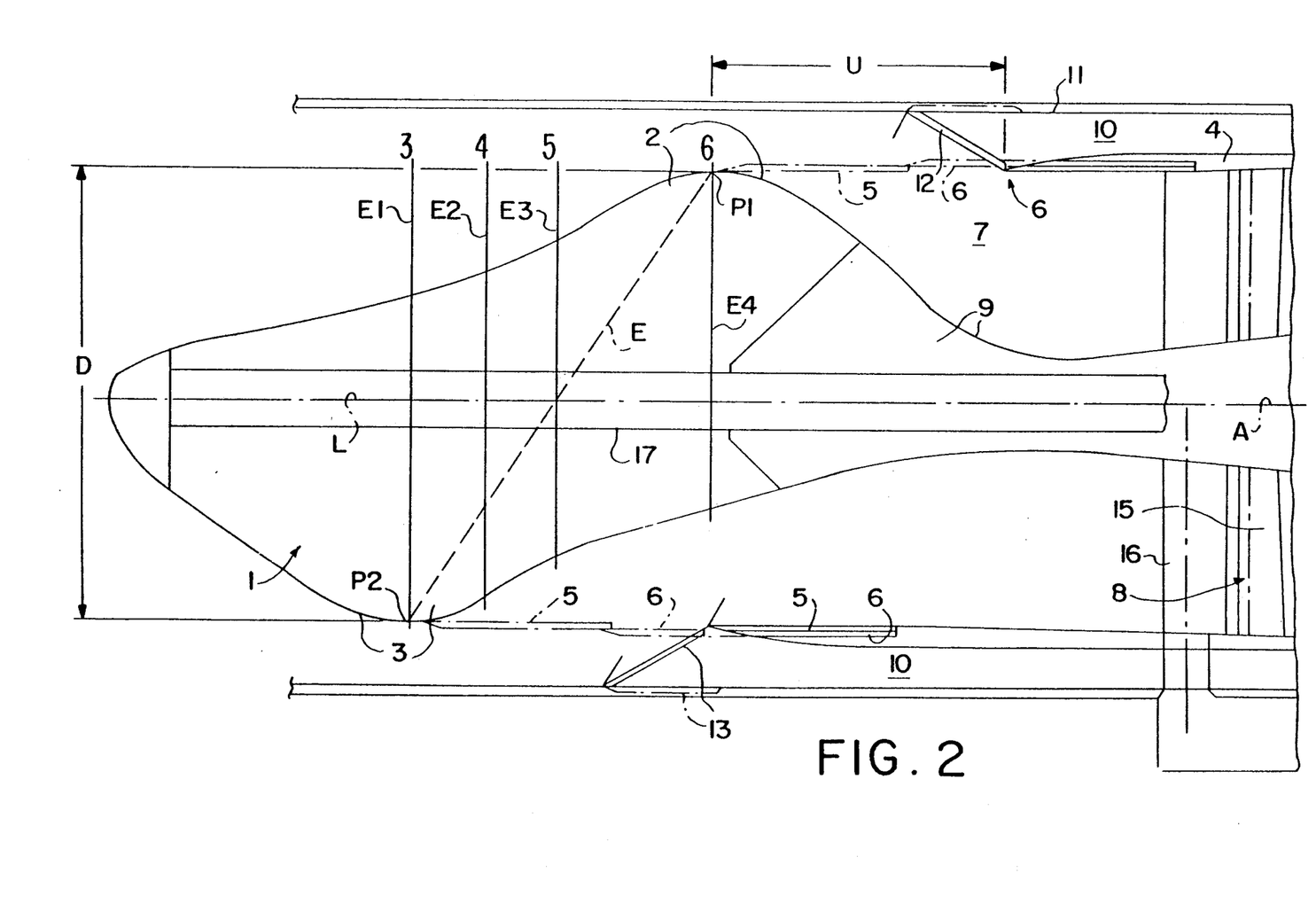
FIG. 2 is a central longitudinal sectional view of the front section of the engine according to FIG. 1, in combination with a ram pressure air duct, for example in a compound turbo ramjet engine, shrouding the basic turbo-engine in which additional flaps are outlined for the selective shutting-off or exposing of the ram pressure air duct in corresponding end positions.

As shown in FIGS. and 2, the air inlet into the compressor 8 of the jet engine (not shown) is embodied by adjustable inlet guide blades 15, in front of which are connected axial supporting blades 16.

The centerbody 1 has an axially central reinforcing tube 17. In addition, the centerbody 1 includes a section 9 which ends at the inlet into the compressor 8 and, in this case, is located downstream in the intake air flow direction. The section 9 is designed to be convergent-/divergent. A first cross-sectional profile, i.e. The convergent part, transforms into a circumferentially symmetrical cross-sectional profile by increasing in cross section in the direction of the compressor inlet, i.e. The divergent part. In addition, the spacing or opening surface U which can be selectively exposed or shut off by means of an annular-slide-valve-type shut-off device, is connected to an air intake duct 7 which is located between certain parts of the shroud 4 forming the casing lip G and the circumferential exterior wall of the above-mentioned section 9 of the centerbody 1.

Referring to FIG. for example, two telescope-type axially adjustable rings 5, 6 which, at the same time locally engage one another, are provided as the annular-slide-valve-type shut-off devices. In the exposure position of the spacing U or the intake air supply for the compressor 8, the two rings 5, 6 are stacked on one another in the shroud 4 as shown by the heavy lines 5, 6 in FIG. 1. The ring contours are illustrated by means of drawn-out lines 5, 6 in the shut-off position closing the space U. The two rings 5, 6 function in a lip-type manner to close or open the spacing U. The moved-out, i.e. shut-off, position of the rings 5, 6 characterizes the shut-off position of the spacing U or the ambient air supply to the engine.

In FIG. 2, the shut-off position is shown with respect to the ram pressure air supply when the ramjet operation is switched on and the basic turbo-engine is switched off. In this case, the basic turbo-engine, with respect to its construction, may be virtually identical with the jet engine according to FIG. 1. This is demonstrated, by among other things, with the compressor 8 (compressor inlet) which is illustrated for both FIGS. in the same manner. In addition, within the scope of the shut-off device according to the invention, the centerbody construction previously discussed with respect to FIG. 1 as well as the development and the assignment of the air intake duct 7 is virtually identical to that according to FIG. 2.

FIG. 2 differs from FIG. 1 in that a compound gas turbine ramjet engine is shown. In this case, an additional exterior ring-shaped ram pressure duct 10 is formed between the shroud 4 of the basic engine and an outer circular circumferential wall 11. In this case, the wall 11 extends in an upstream direction essentially beyond the centerbody 1. The annulus, which in this case is then formed between the centerbody 1 and the exterior circumferential wall !1 may be connected with a variable overall inlet of the compound engine system by way of an air supply wing (not shown in detail).

Referring to the compound gas turbine ramjet engine shown in FIG. 2, flaps 12, 13 are pivotally arranged on the outer surrounding wall 11 of the ram pressure air duct 10. The flaps 12, 13 are arranged to shut off the ram pressure air duct 10 as shown in a first end position illustrated by the drawn-out lines, i.e. ramjet operation off, while the intake air supply into the basic engine is exposed by means of the annular ring valves 5, 6. In addition, the flaps 12, 13 can be pivotally arranged in such a manner to release the ram pressure air supply into the ram pressure air duct 10 as shown in a second end position (dash-dotted, basic turbo-engine operation switched off) while the basic turbo-engine is shut off by means of the annular ring valves 5, 6. Advantageously, the flaps 12, 13 sealingly move against the outer end of the casing lip G in the first end position. In the second dash-dotted end position, the flaps 12, 13 can advantageously be moved completely into the outer surrounding wall 11 of the ram pressure air duct 11 such that, in this end position, the flaps 12, 13 present no aerodynamic obstacles to the ram pressure air flow.

As shown in FIG. 2, the flaps 12, 13 form guiding devices for the intake air by way of duct 7 to the compressor 8 when situated in the first end position.

Figure 8:
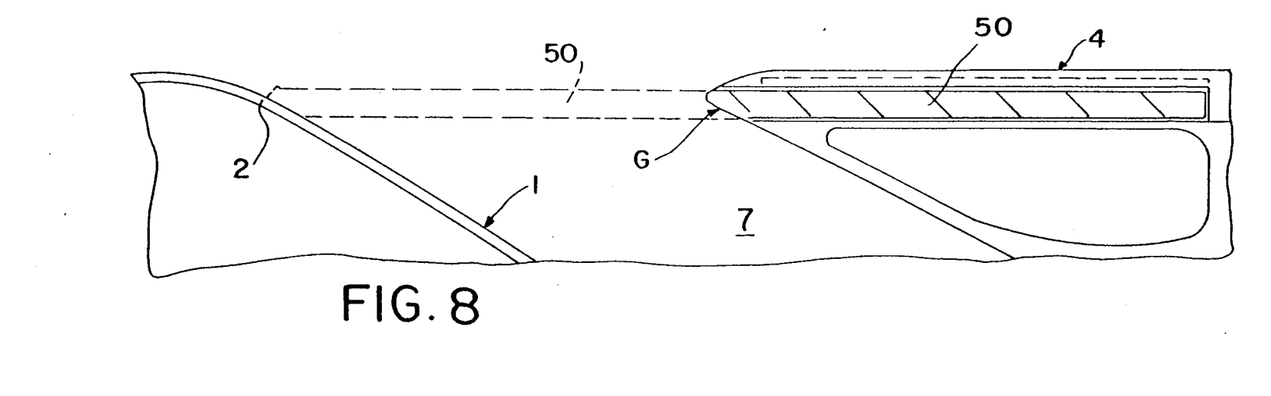
FIG. 8 is a sectional view of another embodiment of the invention.

It is readily understood by one skilled in the art that a one-piece axially movable ring 50 (FIG. 8) may be provided for the annular-slide-valve-type device to shut off or expose the engine according to FIGS. 1 or 2. In the release position with the aerodynamic closure of the casing lip, the one piece ring will have moved completely into the shroud of the jet or basic engine.

Figure 9:
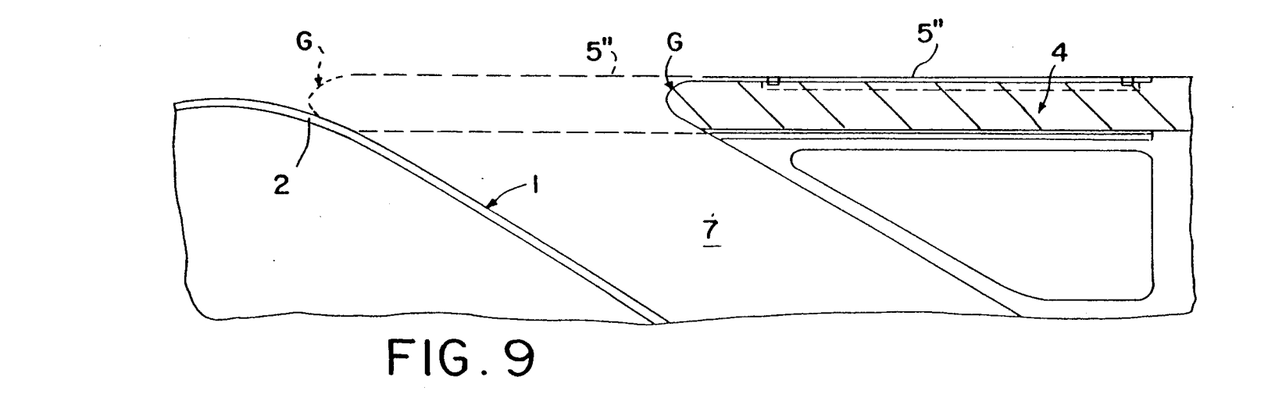
FIG. 9 is a sectional view of another embodiment of the invention.

Instead of the above-discussed annular slide valve configurations, an axially movable hood body may be provided (FIG. 9). The hood body may be moved completely onto the end of the engine shroud, i.e., the mounted end position, when in a release position of the circumferential surface or the intake air supply into the engine while forming the casing lip.

Figure 7:
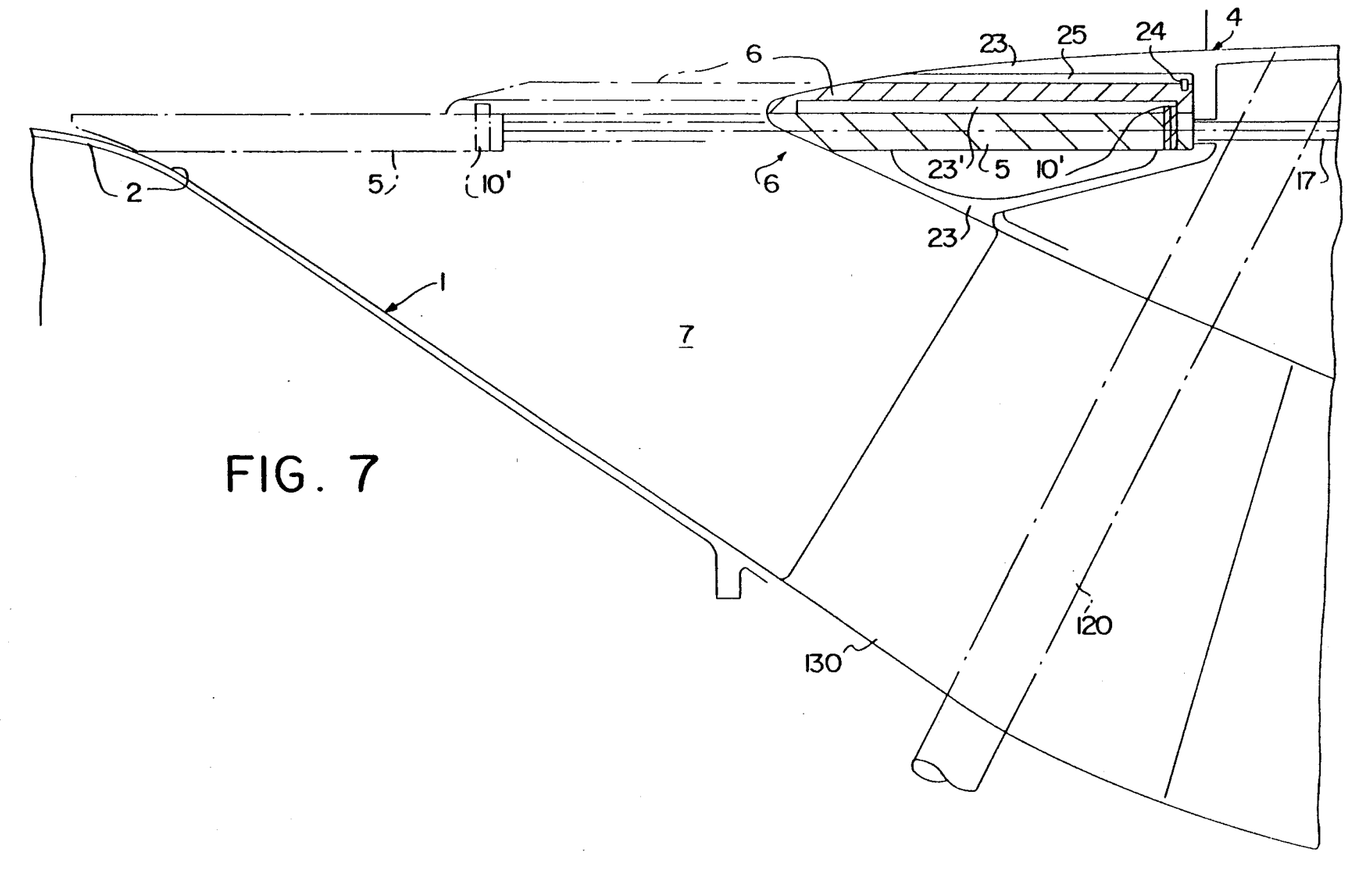
FIG. 7 is a partial enlarged view of the engine illustrating the invention in greater detail with respect to a telescope-type annular slide valve configuration according to FIGS. 1 or 2, modified in minor respects in comparison to FIGS. 1 and 2.

Referring to FIG. 7 further details of the telescope-type annular slide valve arrangement according to FIGS. 1 or 2 is shown. The casing lip G is shown as a component of a casing body 23 of the shroud 4 into which both rings 5, 6 are completely moved in the release position. Thus, in this position, frontal rounded surface contours of the rings 5, 6 at the same time provide an aerodynamically favorable design of the end contour of the lip G. Several compression-tension rods 17 which are uniformly distributed along the circumference of the shroud and are connected with pneumatically or hydraulically actuated adjusting members are applied to the respective inner ring 5 which is first moved out during the shutting-off operation. Pins 10' located at the inner ring 5 engage in longitudinal grooves 23' of the outer ring 6 for the purpose of moving the outer ring 6 along with the inner ring 5 as shown by the dash-dotted moved-out position. Additional axial grooves 25 are developed on the casing body 23 as end stops which limit the maximum moving-out of both rings 5, 6. Specifically, the opposite rear fixed pins 24 on the outer ring 6 engage in the grooves 25 and are limited by the front end on the grooves 25. Reference number !20 in FIG. 7 is a drive or output shaft of the apparatus which extends through a supporting blade 130.

The gas turbine jet engine according to FIG. 1 and the basic turbo-engine according to FIG. 2 may successively include a multi-stage axial-flow compressor, an annular combustion chamber and a compressor driving turbine which is connected behind the annular combustion chamber. As the basic turbo-engine with the ramjet engine, the initially indicated ring-shaped ram pressure duct downstream of the mentioned compressor driving turbine may change into a jet pipe having a variable thrust nozzle connected behind it. An afterburning device, i.e. for supersonic flight operation, as well as a combined booster combustion device, i.e. for hypersonic flight operation, may be arranged in the jet pipe.

According to the present invention, for a compound gas turbine ramjet engine, a shutting-off of the basic engine on the hot-gas side (nozzle) may also take place in an annular-ring-valve-type manner as well as by means of a centerbody in a spatially displaced drop or mushroom shape. Specifically, this shutting off may take place with respect to the ram pressure air flow when the ramjet operation is switched on.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A device for exposing and shutting off a turbojet engine on an air intake side of the turbojet engine, comprising:
    an engine shroud having a face end forming a casing lip;
    a stationary centerbody arranged in front of said turbojet engine and including at least two vaulted areas axially and circumferentially displaced approximately 180° with respect to one another along a largest relative diameter, said stationary centerbody enclosing an axially spaced circumferential opening between said at least two vaulted areas and said casing lip; and
    an annular slide valve which selectively extends from said engine shroud to expose or shut off the axially spaced circumferential opening.

2. A device according to claim 1, wherein said at least two vaulted areas are formed on said centerbody and are axially and circumferentially spatially displaced with respect to one another to provide a divergent/convergent shaped center body.

3. A device according to claim 1, wherein said annular slide valve comprises a one-piece annular slide valve arranged to be axially movable, said one-piece annular slide valve being moved completely into said engine shroud in an aerodynamic closure of said casing lip in an exposed position of the circumferential opening.

4. A device according to claim 2, wherein said annular slide value comprises a one-piece annular slide valve arranged to be axially movable, said one-piece annular slide valve being moved completely into said engine shroud in an aerodynamic closure of said casing lip in an exposed position of the circumferential opening.

5. A device according to claim 1, wherein said annular slide valve comprises an annular-slide-valve hood body arranged to be axially movable, said hood body being mounted completely on said end of the engine shroud in the formation of said casing lip when in an exposed position of the circumferential opening.

6. A device according to claim 2, wherein said annular slide valve comprises an annular-slide-valve hood body arranged to be axially movable, said hood body being mounted completely on said end of the engine shroud in the formation of said casing lip when in an exposed position of the circumferential opening.

7. A device according to claim 1, wherein said annular slide valve comprises:
    at least two rings axially adjustable in an operatively telescoping manner engaging one another, said at least two rings being moved into said engine shroud above one another in an aerodynamic closure of said casing lip when in an exposed position of said circumferential opening.

8. A device according to claim 2, wherein said annular slide valve comprises:
    at least two rings axially adjustable in an operatively telescoping manner engaging one another, said at least two rings being moved into said engine shroud above one another in an aerodynamic closure of said casing lip when in an exposed position of said circumferential opening.

9. A device according to claim 1, wherein said stationary centerbody has its longitudinal axis arranged as an axial extension of the engine axis, said centerbody including a shut-off surface which is at least one of an elliptical and circular shape along its entire circumference, said shut-off surface following a diagonal plane intersecting said at least two vaulted areas at said largest relative diameter.

10. A device according to claim 9, wherein said face end of said engine shroud contains said casing lip, said casing lip being adapted to said shut-off surface of the centerbody and being bevelled to slope in the same direction with respect to said engine axis.

11. A device according to claim 1, further comprising:
    a ring-shaped air intake duct connected with said circumferential surface;
    a compressor having an inlet;
    wherein said centerbody includes a first section ending at said inlet, said ring-shaped air intake duct formed between said engine shroud having the casing lip and said section of said centerbody;
    wherein said section is designed to be convergent/divergent in a flow direction including a first cross section profile in the direction of the compressor inlet which increasingly transforms into a circumferentially symmetrical cross-sectional profile.

12. A device according to claim 2, further comprising:
- a ring-shaped air intake duct connected with said circumferential surface;
- a compressor having an inlet;
- wherein said centerbody includes a first section ending at said inlet, said ring-shaped air intake duct formed between said engine shroud having the casing lip and said section of said centerbody;
- wherein said section is designed to be convergent/divergent in a flow direction including a first cross section profile in the direction of the compressor inlet which increasingly transforms into a circumferentially symmetrical cross-sectional profile.

13. A device according to claim 1, wherein said centerbody includes:
- a partially asymmetrical and elliptical cross-sectional profile in a first vertical intersecting plane; and
- an asymmetrical cross-sectional profile in a second vertical intersecting plane arranged downstream of said first plane, said first and second planes intersecting one of said vaulted areas at first and second points, respectively, each of said points being within one of said vaulted areas spatially displaced from one another, said first and second points forming the ends of said largest relative diameter.

14. A device according to claim 12, wherein said centerbody includes:
- a partially asymmetrical and elliptical cross-sectional profile in a first vertical intersecting plane; and
- an asymmetrical cross-sectional profile in a second vertical intersecting plane arranged downstream of said first plane, said first and second planes intersecting one of said vaulted areas at first and second points, respectively, each of said points being within one of said vaulted areas spatially displaced from one another, said first and second points forming the ends of said largest relative diameter.

15. A device according to claim 1, wherein said turbojet engine is a compound gas turbine ramjet engine including an inner gas turbine jet engine provided for subsonic and supersonic flight operation, further comprising:
- a predominantly ring-shaped ram pressure duct shrouding said inner gas turbine jet engine for providing hypersonic flight operation;
- wherein said centerbody interacts with said annular slide valve such that when ramjet operation is switched on, said annular valve shuts off said inner gas turbine jet engine either on an air intake side with respect to a ram pressure air flow into said ram pressure duct.

16. A device according to claim 15, wherein an outer surrounding wall of said ram pressure air duct includes flaps pivotally arranged such that, in a first end position while an intake air supply into said inner gas turbine jet engine is exposed in the manner of said annular slide valve, said flaps shut off said ram pressure air duct and, in a second end position while the inner gas turbine jet engine is shut off in the manner of said annular slide valve, said flaps release the ram pressure air supply into said ram pressure air duct.

17. A device according to claim 16, wherein said flaps in said first end position, sealingly move against said face end of said casing lip on the engine shroud and, in said second end position, are completely moved into said outer surrounding wall of said ram pressure air duct.

18. A device according to claim wherein an outer surrounding wall of a ram pressure air duct, as an upstream coaxial or axially parallel extension, substantially extends over said centerbody and is connected to an overall engine inlet of a variable geometry.

19. A device according to claim 15, wherein an outer surrounding wall of a ram pressure air duct, as an upstream coaxial or axially parallel extension, substantially extends over said centerbody and is connected to an overall engine inlet of a variable geometry.

20. A device according to claim 18, wherein said outer surrounding wall, upstream i the direction of said shut-off surface widens with respect to a space between the outer surrounding wall and the shut-off surface.

* * * * *